US006901149B2

(12) United States Patent
Suruga

(10) Patent No.: US 6,901,149 B2
(45) Date of Patent: May 31, 2005

(54) AUDIO MIXER

(75) Inventor: Michio Suruga, Tokyo (JP)

(73) Assignee: Korg Incorporated (JP)

( * ) Notice: Subject to any disclaimer, the term of this patent is extended or adjusted under 35 U.S.C. 154(b) by 727 days.

(21) Appl. No.: 09/756,877

(22) Filed: Jan. 10, 2001

(65) Prior Publication Data

US 2001/0009584 A1 Jul. 26, 2001

(30) Foreign Application Priority Data

Jan. 24, 2000 (JP) ....................................... 2000-014967

(51) Int. Cl.[7] .................................................. H04B 1/00
(52) U.S. Cl. .......................................... 381/119; 381/63
(58) Field of Search ................................. 381/119, 104, 381/109, 98, 99, 61, 62, 63, 80, 81, 100

(56) References Cited

U.S. PATENT DOCUMENTS 5,111,508 A * 5/1992 Gale et al. .................. 381/100
5,212,733 A * 5/1993 DeVitt et al. ............... 381/119
5,237,619 A * 8/1993 Frassinetti .................. 381/119
5,933,505 A * 8/1999 Bargauan .................... 381/119

* cited by examiner

*Primary Examiner*—Stella Woo
(74) *Attorney, Agent, or Firm*—Connolly, Bove, Lodge & Hutz LLP

(57) ABSTRACT

An in-plane position sensor detects positions along two directions or X-Y directions to produce a pair of position signals concurrently. The pair of position signals controls control parameters which influence upon a variety of effecters and addition processor which are implemented in a digital arithmetic unit (DSP).

9 Claims, 16 Drawing Sheets

AUDIO MIXER

BACKGROUND OF THE INVENTION

The present invention relates to a mixing of a plurality of musical signals from a variety of record players and CD players in real time, or providing an audio mixer which may be utilized in a disc jockey rendition as found in a dancing club, radio broadcasting programs or the like, for example, to change a musical signal being performed into another momentarily to aid some performance, in particular, an audio mixer of excellent maneuverability.

FIG. 1 shows an exemplary functional arrangement of a conventional audio mixer. An audio mixer 10 shown includes audio input terminals 11 and 12 for two channels, to which audio signals CH1, CH2 are input and then subject to effect algorithm processors 21, 22 which add appropriate acoustical effects thereto before they are added together at a suitable addition ratio in an addition processor 23. An effect algorithm processor 24 adds an appropriate acoustical effect to the added signal, which is then delivered as an audio signal from an output terminal 17.

Effect algorithm processors 21, 22, 24 and the addition processor 23 are implemented with a digital arithmetic unit 20, which is commonly referred to as DSP (digital signal processor). Audio signals which are input to the input terminals 11 and 12 (which are generally both stereo signals and their signal paths comprise stereo signal transmission paths) are fed through volume controls 13, 14, respectively, to A/D converters 15, 16, respectively, where they are converted into digital signals to be input to the digital arithmetic unit 20. The effect algorithm processors 21, 22 apply the addition of reverberations, echoes, chorus effects, distortions or the like, for example, to both or either one of the audio signals. Output signals from the processors 21, 22 are added together at a suitable addition ratio in the addition processor 23, and the effect algorithm processor 24 again applies an appropriate acoustical effect (such as volume and tone control, for example) to the added signal to be fed to a D/A converter 18 where the latter is converted into an analog signal, which is then delivered as an analog audio signal from the output terminal 17.

An operational mode of the digital arithmetic unit 20 is set up by a controller 26 which principally comprises a microcomputer. As is well known, the controller 26 comprises a central processing unit 26A, a rewriteable RAM 26B, a read only memory ROM 26C, an input port 26D and an output port 26E.

An entry setting unit which is mounted on a control panel 30 is connected to the input port 26D. To exemplify the entry setting unit, it may includes as a required minimal arrangement, a mode changeover switch 31 and three sliding variable resistors 32, 33, 34. By operating the mode changeover switch 31 to a selected position, the operational mode of the digital arithmetic unit 20 can be changed. Thus, when the mode changeover switch is thrown to a selected position, each of the effect algorithm processors 21, 22, 24 can be independently configured to operate as a variable low pass filter, a variable high pass filter or as a variety of effecters such as an effecter adding reverberations, an echo adding effecter or a sound distorting effector.

The selected operational mode is indicated on a indicator 27 which is connected to the output port 26E, whereby a user can know which mode is established by recognizing the mode indication on the indicator 27. An entry setting unit which sets up a variety of parameters in addition to the mode changeover switch 31 and the sliding variable resisters 32 to 34 in order to achieve various other effecter operations is also known, but will not be described herein for the sake of simplicity.

A program which causes the microcomputer defining the controller 26 to operate in accordance with a selected mode is stored principally in ROM 26C.

For example, when the mode changeover switch 31 is thrown to the position No. 1, the operation in a cross fade mode is established. In a cross fade mode, the addition ratio between the signals CH1 and CH2 which are input to input terminals 11 and 12 can be changed in a differential manner. A functional arrangement of the digital arithmetic unit 20 when it is set up in the cross fade mode is shown in a simplified form in FIG. 2. When this mode is set up, the effect algorithm processors 21, 22 and 24 are set up to freely pass the input signals therethrough, and the addition processor 23 is replaced by a condition which is equivalent to a variable resistor having opposite ends to which the signal CH1 and CH2 are input, respectively, and having a movable tap from which a synthesized signal is delivered. Thus, when the cross fade mode is established, an execution of the program by the microcomputer causes the digital arithmetic unit 20 to perform the addition in accordance with the sliding position of the movable tap on the sliding movable resister 32.

Accordingly, in the cross fade mode of the addition processor 23, the volumes of the signal CH1 and CH2 can be controlled in a differential manner through the controller 26, by operating the sliding movable resister 32. In other words, a switching from the signal CH1 to the signal CH2 or from the signal CH2 to the signal CH1 can take place in a gradual manner. Such switching is referred to as cross fade.

FIG. 3 shows a functional arrangement of an operational mode in which the function of changing the frequency response of the filters in the respective input channels is added to the cross fade from the signal CH1 to the signal CH2. This operational mode may be considered as being established when the mode changeover switch 31 shown in FIG. 1 is thrown to the position No. 2, for example. In this instance, the digital arithmetic unit 20 is configured so that the functions of a variable low pass filter and a variable high pass filter are imparted to the effect algorithm processors 21 and 22, respectively. In the example shown in FIG. 3, the variable low pass filter function is imparted to the effect algorism processor 21 which is associated with the signal CH1 while the variable high pass filter function is imparted to the effect algorithm processor 22.

The cut-off frequency of the variable low pass filter which is formed by the effect algorithm processor 21 can be moved to a higher or a lower frequency by sliding the variable resistors 33 mounted on the control panel 30. Similarly, the cut-off frequency of the variable high pass filter which is formed by the effect algorithm processor 22 can be moved to a higher or lower frequency by sliding the variable resisters 34. Accordingly, when the sliding variable resistors 32 which controls the addition processor 23 is operated to switch gradually from the signal CH1 to the signal CH2 while simultaneously operating the sliding variable resistors 33 and 34 in a differential manner (or moving the slider positions differentially) to lower the cut-off frequencies of both the variable low pass filter and the variable high pass filter, the tone in the signal CH1 which contains a middle and a high pitch region component change into ones in which the lower pitch components are principal while the signal CH2 which originally contains only high pitch region components gradually changes into ones which include both middle and low pitch region components, thus producing tones which are clearly perceivable.

Accordingly, when the sliding variable resistors 33 and 34 are operated in a differential manner while operating the sliding variable resistor 32, a switching of the signal tones will be felt more naturally than when the cross fade takes place simply in terms of the volumes, thus realizing a cross fade with a more excellent rendition in audible sensation.

FIG. 4 shows a functional arrangement of another operational mode which is established by throwing the mode changeover switch 31 shown in FIG. 1 to the position No. 3 to add the function of adding reverberations only to those signals which fade out during the cross fade. At this end, the effect algorithm processor 21 (or 22) is set up as a reverberation or echo effecter. Specifically, FIG. 4 shows that the effect algorithm processor 21 includes a reverberation adding unit 21-1, and an addition processor 21-2 which achieves a cross fade between a reverberation added tone and direct tone which is not added with a reverberation.

The addition processor 21-2 which is configured in the effect algorithm processor 21 can be controlled by sliding the sliding variable resistor 33 mounted on the control panel 30 to change the addition ratio or mix balance between the reverberated tone and non-reverberated or direct tone. For example, when the cross fader is moved in a direction from the signal CH1 toward the signal CH2, the cross fader may be operated, and simultaneously, the sliding variable resistor 33 may be moved from a condition in which the proportion of the reverberated tone and the direct tone is equal to 0% and 100%, respectively, to a condition in which the proportion is reversed, or, the reverberated tone occupies 100% while the direct tone occupies 0%. In this instance, the tones in the signal CH1 gradually decrease in volume while shifting to reverberated tones, but the tones in the signal CH2 simply increases in the volume.

It will be seen that these operations not only result in a simple transition of the volume from the signal CH1 to the signal CH2 during the cross fade, but there is obtained a transition in which the signal CH1 changes into reverberated tones which are gradually deepened and are further moving away, and are replaced by the tones of the signal CH2. This realizes a more natural and effective cross fade.

FIG. 5 shows a functional arrangement of an effect insert mode established for the digital arithmetic unit 20 when the mode changeover switch 31 shown in FIG. 1 is thrown to the position No. 4. In the example shown in FIG. 5, the effect algorism processor 22 associated with the signal CH2 is arranged to be a pass-through condition while effect changeover switches SW1 and SW2 are connected before and after the effect algorithm processor 21 in the path of the signal CH1. In this manner, by changing the switches SW1 and SW2, a switching between a condition in which the effect algorithm processor 21 is connected and another condition in which it is replaced by a pass-through condition is achieved. The effect changeover switches SW1 and SW2 are changed by operating a switch 35 which is included in the control panel 30.

The effect function of the effect algorithm processor 21 may be a mode of the addition of the reverberated tones, for example. By operating the sliding variable resistors 33 and 34, the degree of reverberations, namely, how deeply or weakly the reverberations are applied and the time over which the reverberations are attenuated can be controlled.

When it is desired to add reverberations to the signal CH1, the switch 35 may be depressed, for example, and a resulting contact on signal may be applied to the controller 26 to change the effect changeover switches SW1 and SW2 so that the signal CH1 is passed through the effect algorithm processor 21 before it is applied to the addition processor 23. When the sliding variable resistors 33 and 34 are operated simultaneously, reverberated tones are added to the signal CH1 depending on the sliding position, thus changing the depth of reverberations and the attenuation interval. In this instance, the addition ratio by the addition processor 23 is controlled by the sliding movable resistor 32.

It will be seen that a conventional audio mixer suffers from a poor maneuverability in that its operation is troublesome because the maneuver principally comprises operating the sliding movable resistors 32,33,34 and the switch 35 to implement the cross fade, to change the cut-off frequency of the filter or to change the depth to which the reverberations are added.

The maneuver is troublesome in particular in the arrangement of FIG. 3 where the cut-off frequencies of both variable low pass filter 21 and variable high pass filter 22 must be changed in a differential manner while simultaneously carrying out the cross fade, thus requiring that the three sliding variable resistors 32, 33, 34 be operated at the same time.

In the arrangement of FIG. 2 where a simple cross fade operation takes place, what occurs is a gradual reduction, for example, of the tones in the signal CH1 to be replaced by a gradually increase in the tones of the signal CH2, resulting in a monotonous changeover of tones, which is unnatural disadvantageously. In particular, when the tones in the both signals CH1 and CH2 are mixed together, a simple addition of two input musical tones result in an intricate sound.

In carrying out the cross fade, when the maneuver is made to change the cut-off frequencies of both the variable low pass filter 21 and the variable high pass filter 22 in the same direction as indicated in FIG. 3, if the cross fade is implemented in synchronism, a smooth switching of tones results to improve the audible sensation, which is advantageous. What is brought forth in the actual audible cross fade shown in FIG. 3 will be described below.

When musical tunes as from CD or records are input to the input terminal 11 and 12, it will be noted that signals from the musical instruments which are used in these musical tunes include inherent frequency bands. For example, a bass drum, a cymbal and a guitar or a vocal has its principal signal component in the low pitch tone region, the high pitch tone region, and the middle pitch tone region, respectively. Rather than reducing the volume of the signal CH1 and shifting to the signal CH2 in a simple manner, in the cross fade shown in FIG. 3 in which the cut-off frequencies of the filters in the respective channels are varied, there is an effect that the tones fade out from the signal CH1 in a sequential manner beginning with the high pitch region signal components in the musical instruments while tones from the signal CH2 appear in a opposite sequence beginning with the high pitch signal components of the musical instruments. However, to realize this to effect, the three sliding variable resistors 32, 33, 34 must be operated simultaneously, thus involving the drawback of a difficult maneuver.

In the arrangement shown in FIG. 4, the cross fade while leaving the reverberations allows the tones in the signal CH1 to be gradually changed into reverberated tones rather than simply decreasing the volume thereof, thus achieving an effective cross fade in audible rendition in that the signal CH1 moves farther away while the tones in the signal CH2 come into appearance. However, again the two sliding moveable resistors 32, 33 must be operated simultaneously.

In the effect function adding mode shown in FIG. 5, the switch 35 must be depressed while simultaneously operating the sliding variable again, the maneuver is troublesome and the operator will experience a substantial fatigue when he works over a prolonged length of time.

It is an object of an invention to eliminate inconveniences of the prior art as mentioned above, by providing an audio mixer which can be maneuvered in a simple manner.

SUMMARY OF THE INVENTION

In accordance with the invention, an audio mixer comprises;

an effect algorithm processor inserted into each signal path of a plurality of channels of audio signals;

an addition processor for performing an addition processing of audio signals delivered from respective effect algorithm processors to deliver a single channel signal;

an in-plane position sensor for delivering the position of a maneuvered point on a plane in the form of a first and a second position signal which represent positions in mutually crossing two directions on the plane;

and a controller responsive to the first and the second position signal delivered by the in-plane position sensor by applying a control parameter to at least one of the effect algorithm processor and the addition processor to control at least one of a plurality of responses which are provided by the effect algorithm processors and an addition ratio effected by the addition processor.

The effect algorithm processor and the addition processor have functions which are effectuated in different modes which are set up by a mode changeover switch; in a selected mode, one of the effect algorithm processors has a variable low pass filter function while another has a variable high variable pass filter function and the addition processor has a cross fade high variable pass filter function and the addition processor has a cross fade function; the first and the second position signal are control parameters each controlling the cut-off frequency and the attenuation of the variable low pass and the high pass filter, and the first position signal is also a control parameter controlling an addition ratio effected by the addition processor.

In another selected mode, either one or both of the effect algorithm processors have a reverberation adding function, and the addition processor has a cross fade function. The first position signal is a control parameter controlling the volume of reverberated tones produced by the reverberation adding function, and the second position signal is a control parameter controlling an addition ratio effected by the addition processor.

In a further selected mode, the effect algorithm processor inserted in the path of either one of the audio signals has an effecter function, and the first and the second position signal are control parameters controlling how the effecter function is exercised. The controller includes means for controlling the effecter function to a condition in which it is connected in the path of the audio signal when the position signals are being produced by the in-plane position sensor and a pass-through condition when the position signals are not produced. The controller also includes position storage means which stores the first and the second position signals delivered by the in-plane position sensor and which reads the stored first and second position signals and deliver them as control parameters.

The addition processor and the effect algorithm processors are implemented in a digital arithmetic unit, and the controller is implemented by a microcomputer.

Audio input signals are from a plurality of channels equal to and greater than two, and the audio signals of the plurality of channels are mixed the in-plane position sensor to be delivered as a single channel signal.

The position sensor has an operating surface which can be depressed to deliver position signals. A pressure sensor is disposed in overlapping relationship with the position sensor, and a force of depression applied to the position sensor is detected by the pressure sensor, with a resulting detection signal being applied by the controller to one of the effect algorithm processors as a control parameter which controls the response of this processor.

With the audio mixer according to the invention, the use of the in-plane position sensor as entry means improves the maneuverability. The in-plane position sensor detects positions in two directions along X-Y axes. A position signal taken in one axis direction allows a plurality of different kinds of parameters to be controlled while a position signal taken in the other axis direction allows a plurality of different kinds of parameters, which are distinct from the first mentioned parameters, to be controlled.

Accordingly, if a fingertip is moved in X and/or Y direction on the in-plane position sensor, a plurality of control parameters can be concurrently controlled in accordance with the position where the fingertip is moved to. Thus, for example, the cut-off frequency of the variable filter, the attenuation of the variable filter and the addition ratio of the cross fade can be concurrently controlled. A control over a plurality of acoustical effects is possible with the maneuver of a single fingertip.

When the pressure sensor is provided in addition to the in-plane position sensor, a detection signal from the pressure sensor can be used in controlling acoustical effect adding means, thus providing an advantage that three kinds of parameters can be controlled with the maneuver of a single fingertip.

Thus, the audio mixer of the invention allows a free control over a variety of parameters with a single fingertip, affording the advantage of an excellent maneuverability for the audio mixer.

DESCRIPTION OF PREFERED EMBODIMENTS

Figure 1:
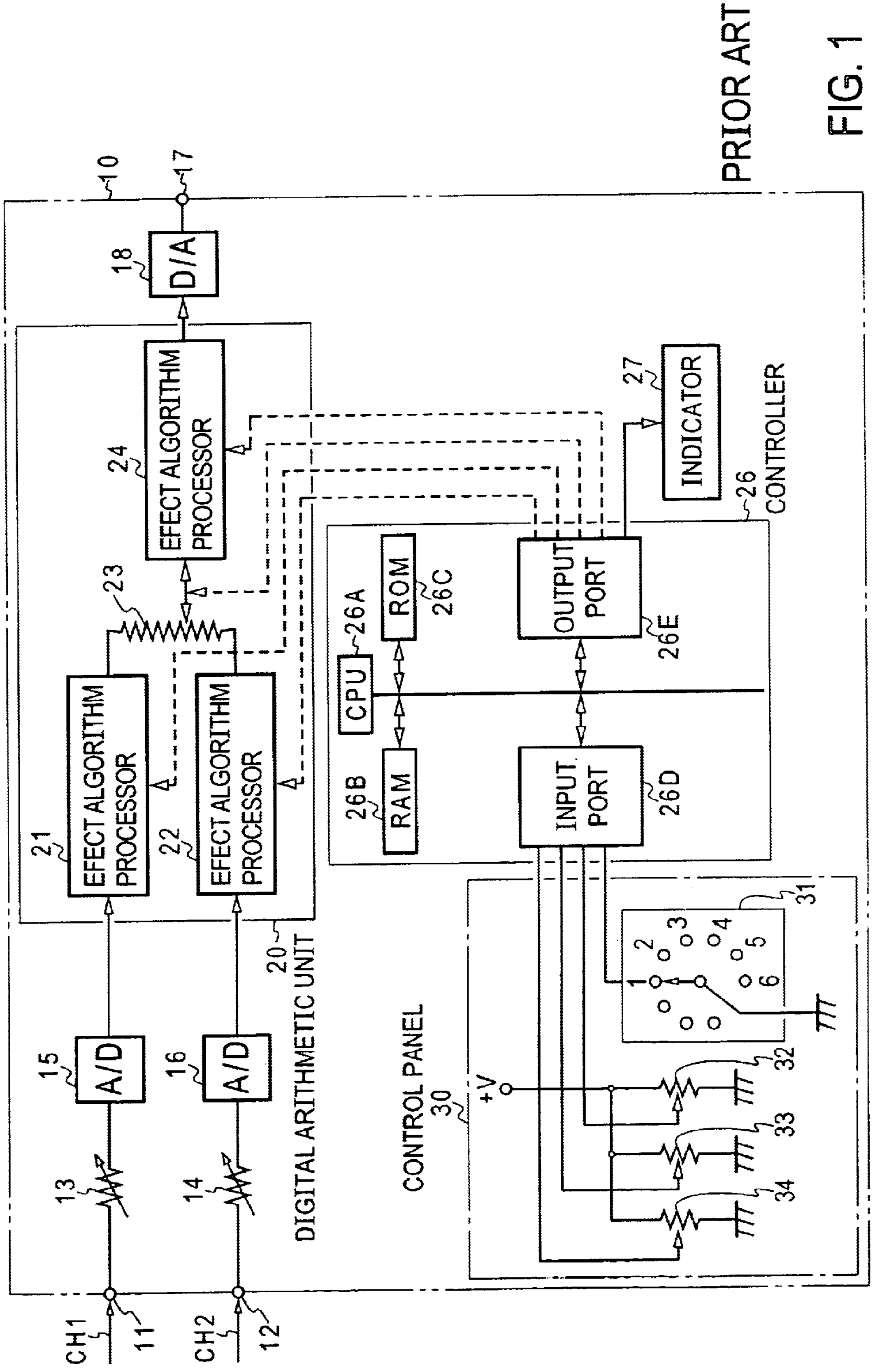
PRIOR ART FIG. 1
FIG. 1 is a block diagram showing a functional arrangement of conventional audio mixer.
Figure 2:
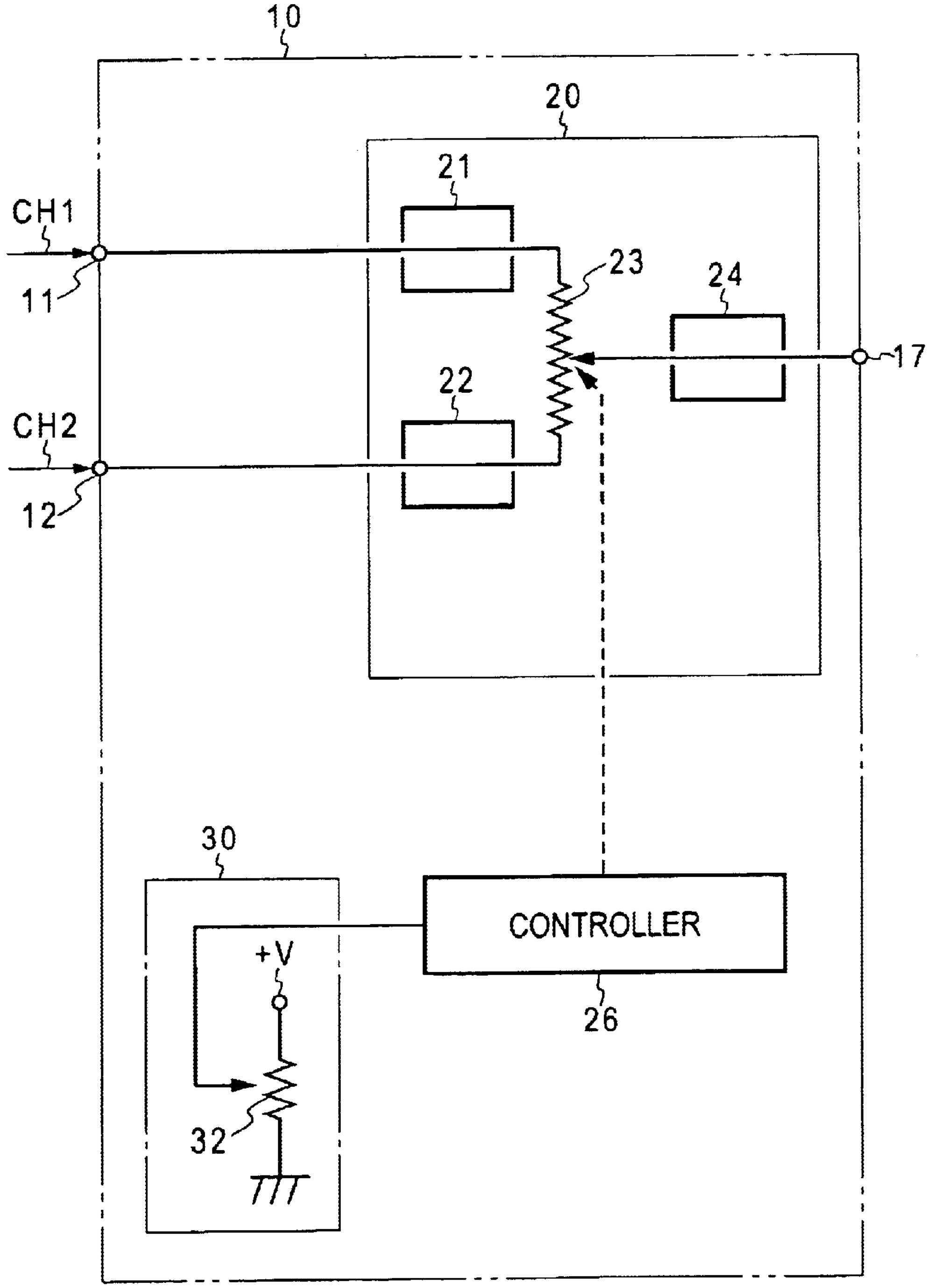
FIG. 2 PRIOR ART
FIG. 2 is a block diagram showing a functional arrangement of an operational mode of the prior art.
Figure 6:
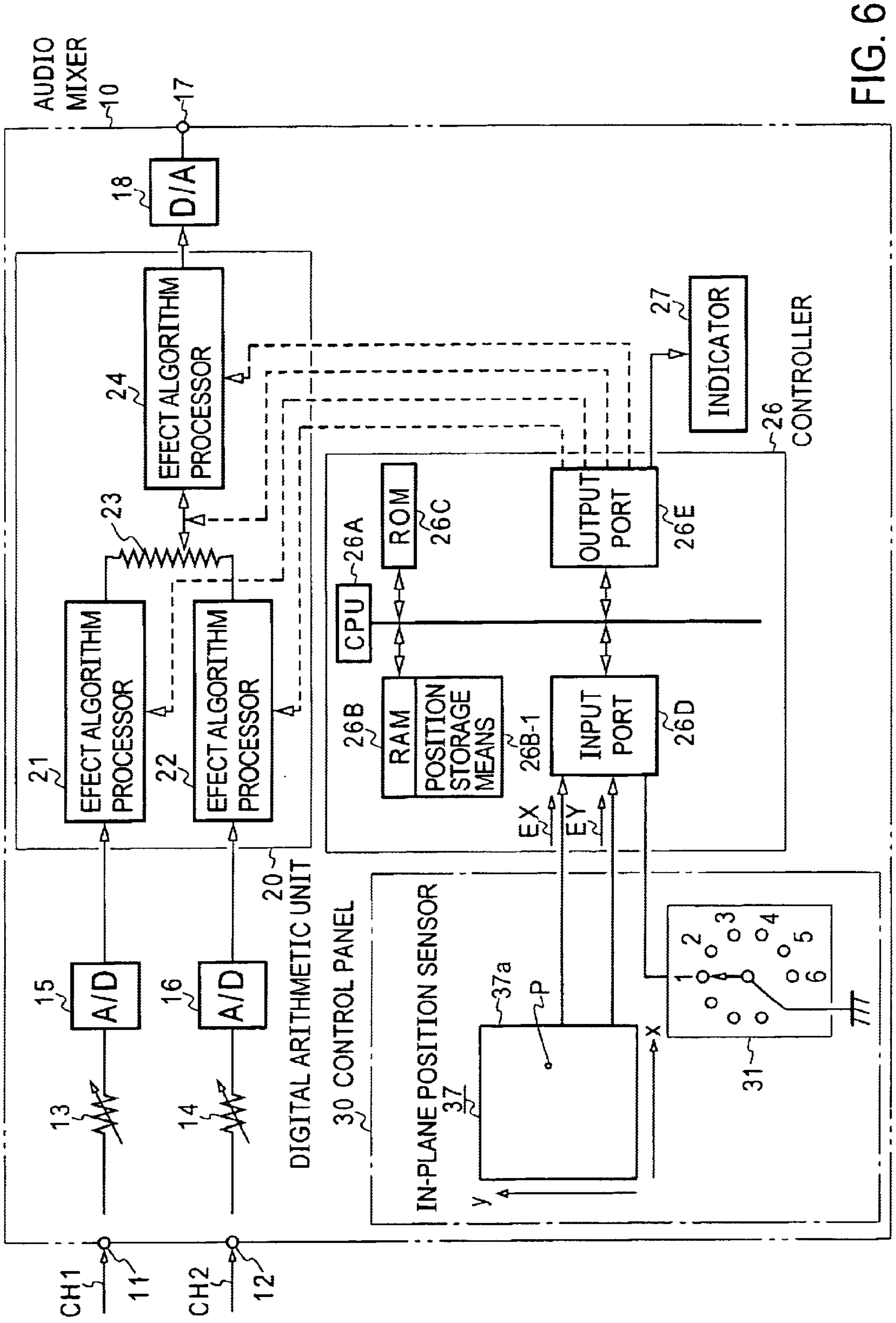
FIG. 6 is a block diagram showing a functional arrangement of one embodiment of the invention.

FIG. 6 shows a functional arrangement of an audio mixer according to one embodiment of the invention. It is to be noted that parts corresponding to those shown in FIG. 1 are designated by like numerals and characters as used before. This embodiment features the provision of an in-plane position censor 37 on a control panel 30 and position storage means 26B-1 in RAM 26B of a controller 26.

In this example, the in-plane position censor 37 produces voltage signals EX and EY as position signals representing respective positions on vertical and horizontal axes. Thus, when a point P on a rectangular operating surface 37*a* is depressed, voltage signals EX and EY which correspond to positions on X(horizontal) axis and Y(vertical) axis are input to an input port 26D of the controller 26. The voltage values of the voltage signals EX and EY are converted into digital signals in an A/D converter which is contained within the input port 26D, and the digital signals representing the positions of the depressed point are read to be stored in RAM 26B. The digital values stored which correspond to the voltage signals EX and EY are later read from RAM 26B to be fed to a digital arithmetic unit 20 as control parameters. The in-plane position censor 37 of the kind described is disclosed, for example, in Japanese Laid-Open Patent Applications No. 86/43,332 (issued Mar. 1, 1986) and No. 91/192,418 (issued Aug. 22, 1991).

Figure 3:
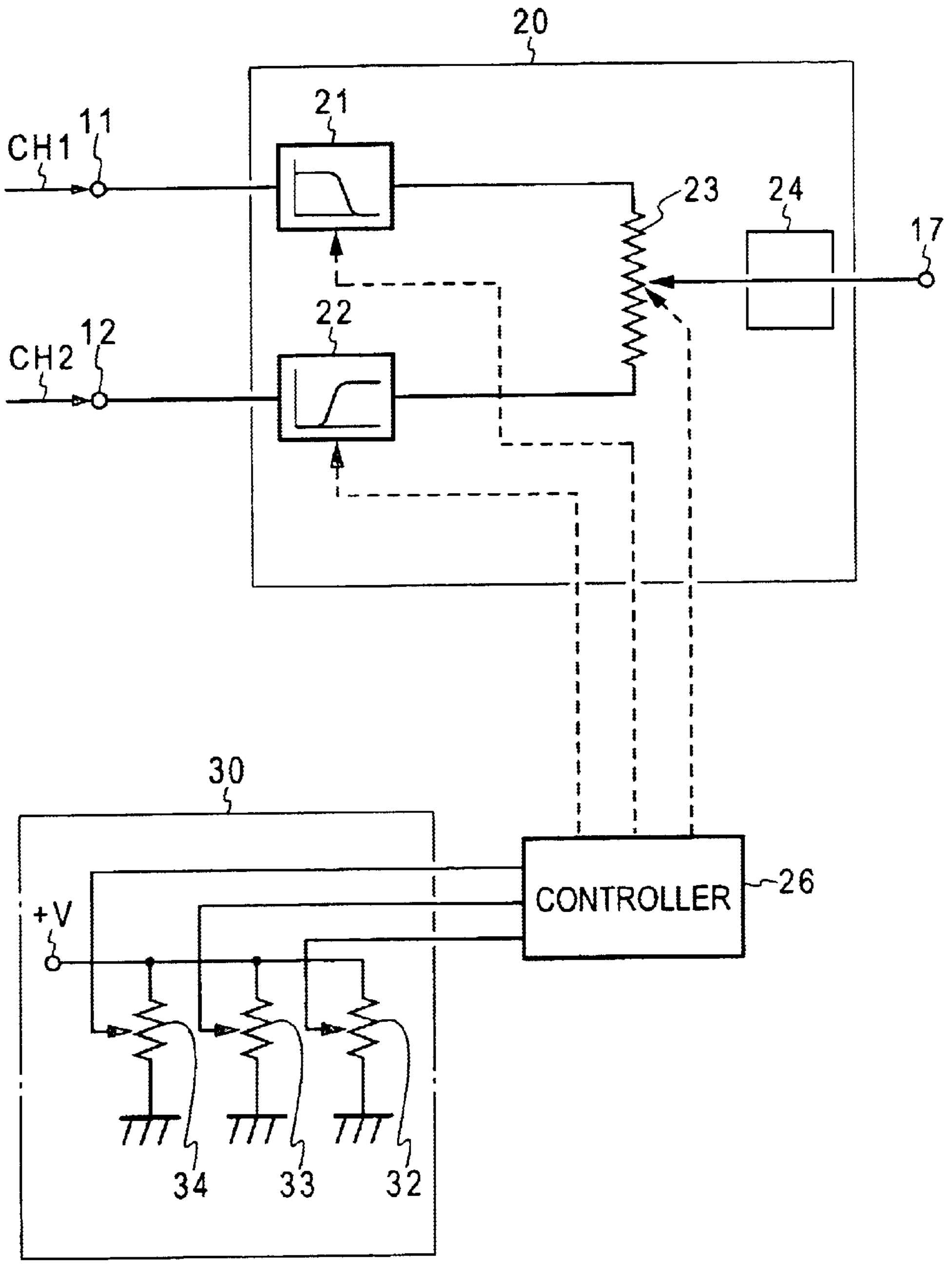
FIG. 3 PRIOR ART
FIG. 3 is a block diagram showing a functional arrangement of another operational mode of the prior art.
Figure 4:
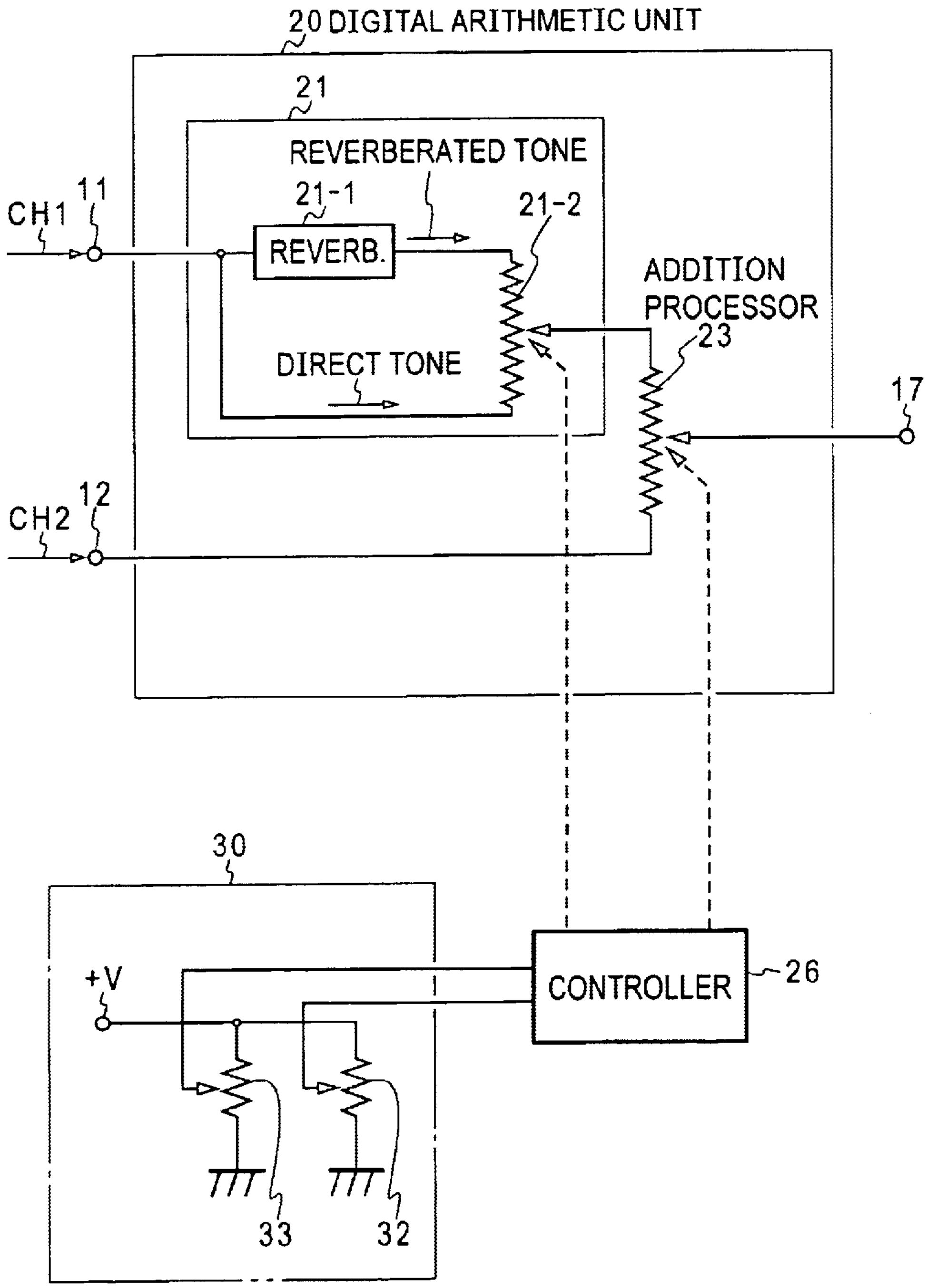
FIG. 4 PRIOR ART
FIG. 4 is a block diagram showing a functional arrangement of a further operational mode of the prior art.
Figure 7:
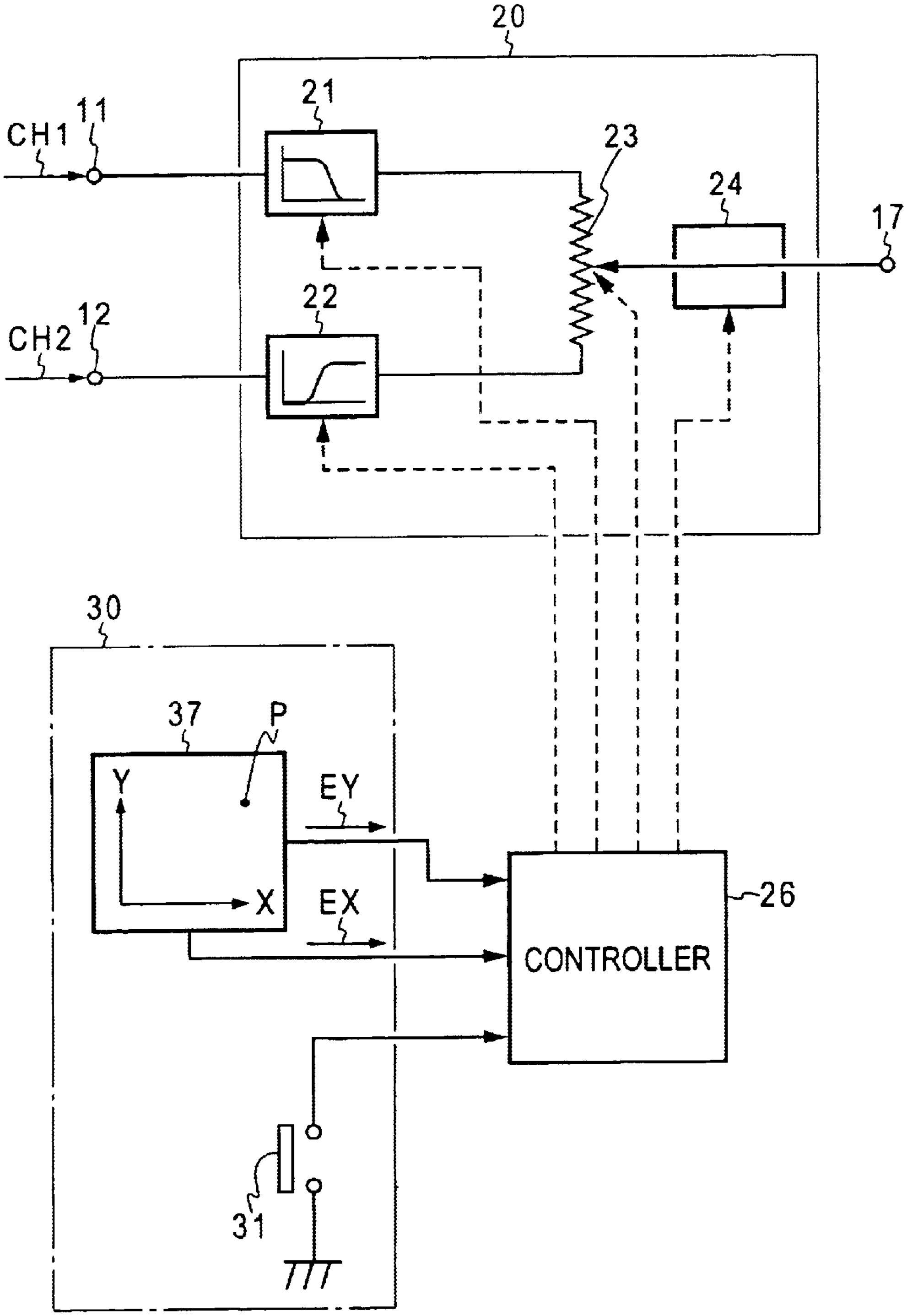
FIG. 7 is a block diagram showing a functional arrangement of an operational mode of the embodiment shown in FIG. 6.

FIG. 7 shows a functional arrangement of the audio mixer 10 shown in FIG. 6 in which the mode changeover switch is thrown to the position No. 2, and the digital arithmetic unit 20 is set up so that the effectg algorithm processors have functions similar to those shown in FIG. 3. When this mode is set up, the functions can be set up in the effect algorithm processors 21, 22 and the additional processors 23 by a similar technique as in the prior art. In the present example, a plurality of different kinds of parameters for the effectors are controlled in one operation in accordance with the voltage signals EX and EY from the in-plane position sensor 37. The plurality of parameters may include a parameter which controls the cut-off frequency of a filter, for example, in accordance with a mode which is set up by the mode changeover switch 31, a parameter which controls the attenuation or gain of the filter, a parameter which controls the addition ratio during the cross fade and the like.

Figure 8A:
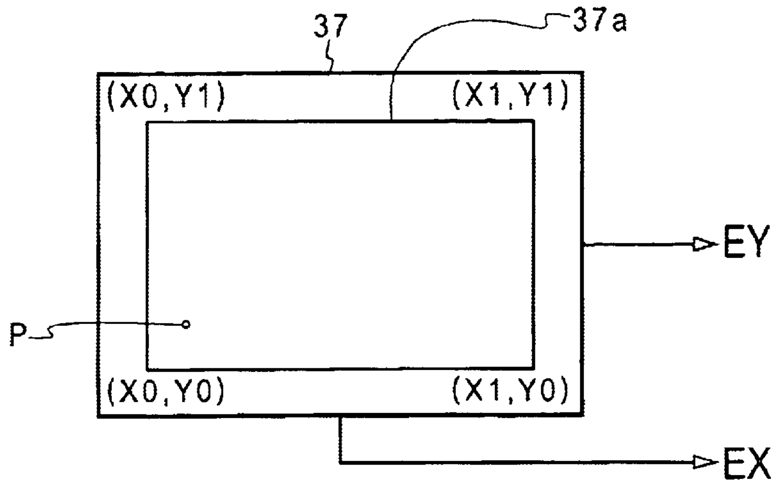
FIG. 8A is a diagram showing the coordinates on an operating surface of an in-plane position censor 37.
Figure 8B:
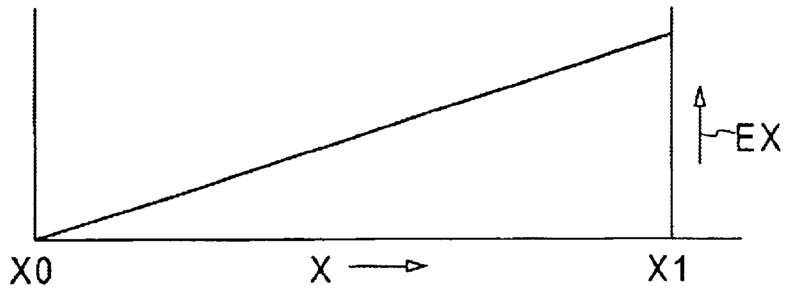
FIG. 8B is a graphical representation of a position signal EX plotted against X-axis position on the operating surface of the in-plane position censor 37.

The description of the in-plane position sensor 37 shown in FIG. 6 will be described in summary with reference to FIG. 8. FIG. 8A shows the coordinate relationship on the operating surface 37*a* in the in-plane position sensor 37. Specifically, the rectangular operating surface 37*a* has a lower left corner located at coordinates (X0, Y0) a lower right corner located at coordinates (X1, Y0), an upper left corner located at coordinates (X0, Y1) and an upper right corner located at coordinates (X1, Y1). The in-plane position sensor 37 delivers a voltage signal EX which corresponds to the X value and a voltage signal EY which corresponds to the Y value of the coordinates (X, Y) of a point on the operating surface 37*a*. The voltage signal EX has a minimum value, which is located at an X coordinate of X0 in the present example while it has a maximum value at an X coordinate of X1. In this manner, the voltage signal EX changes linearly with respect to the X coordinate value, as shown in FIG. 8B.

Figure 8C:
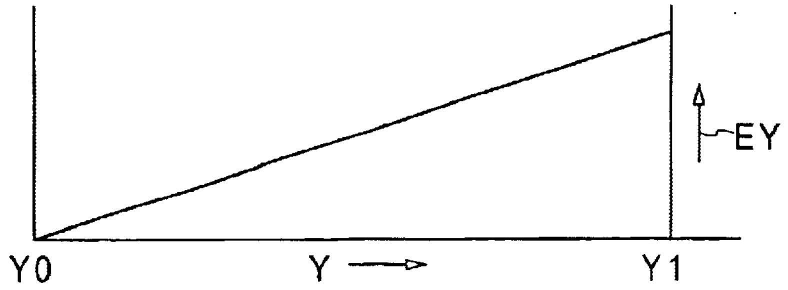
FIG. 8C is a graphical representation of a position signal EY plotted against the Y-axis position on the operating surface of the in-plane position censor 37.

The voltage signal EY has a minimum value, which is located at a Y coordinate Y0, as shown in FIG. 8C, and has maximum value at a Y coordinate of Y1, thus changing linearly with the Y value.

Accordingly, when an arbitrary point P on the operating surface 37*a* is depressed, the position (X, Y) of the point P depressed can be specified by the voltage signals EX and EY which are produced. The controller 26 reads the position signals in the form of the voltage signals EX and EY to specify a position (X, Y) on the plane, and delivers control parameters which depend on this position through RAM 26B to controlled means which are the effect algorithm processors 21, 22 and 24 for controlling their conditions. The stored content in the RAM 26B is sequentially updated in accordance with input position signals EX and EY. When an operation with respect to the in-plane position sensor ceases, the values of the position signals EX and EY which prevailed immediately before are retained in RAM 26B, which delivers these values to digital arithmetic unit 20 as control parameters.

In this embodiment, one of the effect algorithm processors, 21, is configured to operate as a variable low pass filter, the other effect algorithm processor 22 is configured to operate as a variable high pass filter, the cut-off frequencies of the variable low pass filter and the variable high pass filter are controlled with accordance with the position signal EX, the attenuation of the variable low pass filter and the variable high pass filter are controlled in accordance with the position signal EY, and the addition ratio effected by the addition processor 23 is controlled in accordance with either one of the position signals which may be EX, for example.

In this embodiment, when a point maneuvered on the in-plane position sensor 37 has a Y coordinate close to Y0, both the effect algorithm processors 21 and 22 do not have a filter response and accordingly, the frequency response is flat. Specifically, referring to FIG. 9, when the maneuver follows a locus M1 extending from a point (X0, Y0) to a point (X1, Y0), no control is exercised over the effect algorithm processors 21 and 22, and only the addition processor 23 is controlled in accordance with the effect signal EX to carry out the cross fade operation which only involves the volume of the signals CH1 and CH2. In other words, the signals CH1 and CH2 are added together by the addition processor 23 at respective volumes indicated on rectilinear lines J1 and J2 shown in FIGS. 10A and 10B which depend on the position of the locus M1.

The control responses J1 and J2 which are applied to the signals CH1 and CH2 by the addition processor 23 remain invariable if the operated position moves to any position in the Y axis direction.

Figure 9:
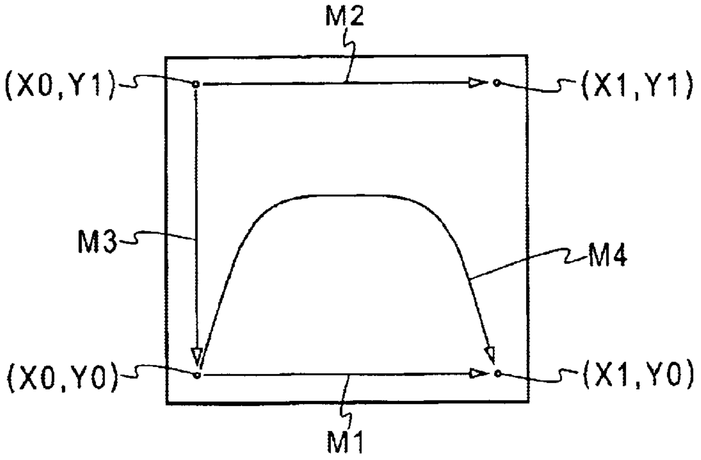
FIG. 9 is a diagram showing loci traced by a variety of maneuvers on the in-plane position censor 37.
Figure 10A:
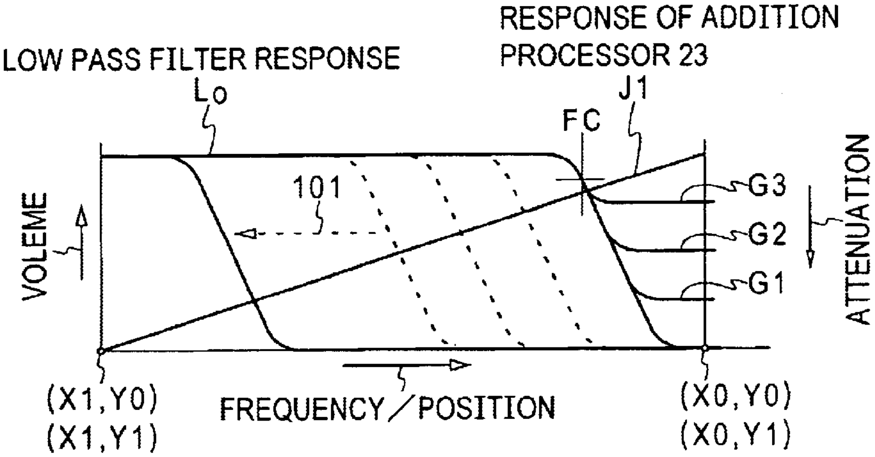
FIG. 10A is a graphical representation of the response of and an output from the low pass filter plotted against a position signal.
Figure 10B:
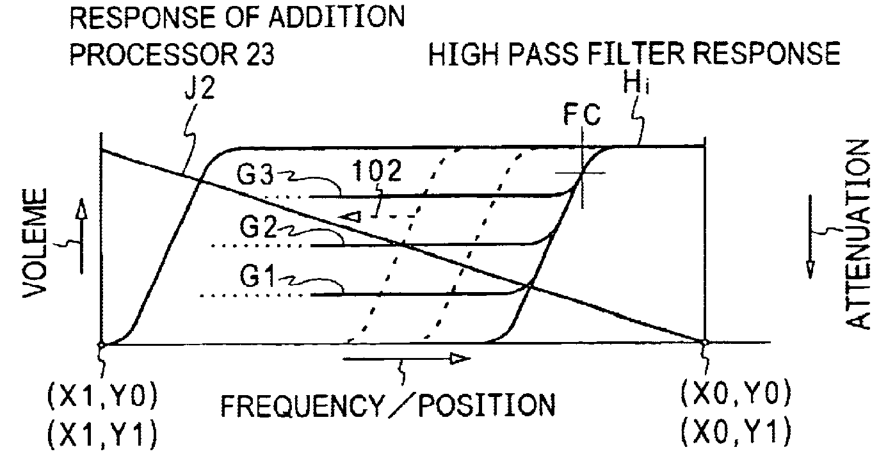
FIG. 10B is a graphical representation of the response of and an output from a high pass filter plotted against a position signal.

On the other hand, when the maneuver takes place along a locus M2 from a point (X0, Y1) to a point (X1, Y1) as shown in FIG. 9, there occur, in addition to the cross fade operation performed by the addition processor 23, the operations of the effect algorithm processors 21 and 22 as a variable low pass filter and a high pass filter, respectively, each having a varying cut-off frequency. A curve $L_o$ shown in FIG. 10A illustrates the behaviour of a change in the cut-off frequency FC of the variable low pass filter into which the effect algorithm processor 21 is configured. The closer the X value moves from X0 toward X1, the lower the cut-off frequency FC as shown by broken line arrow 101. A curve H1 shown in FIG. 10B illustrates the behaviour of a change in the cut-off frequency FC of the variable high pass filter into which the effect algorithm processor 22 is configured. The closer the X value moves from X0 toward X1, the lower the cut-off frequency FC as shown by broken line arrow 102.

Figure 11A:
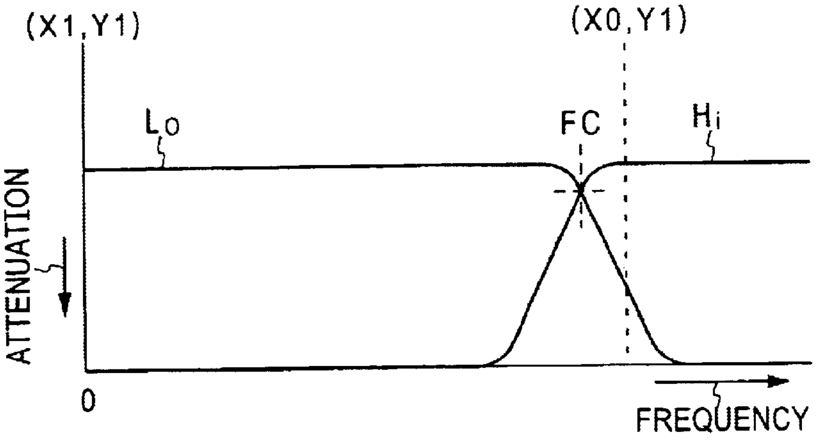
FIG. 11 is a characteristic diagram of a low pass filter and a high pass filter when a point depressed is located close to (X0, Y1)
FIG. 11B is a characteristic diagram of the both filters when a point depressed is located intermediate (X1, Y1) and (X0, Y1)
FIG. 11C is a characteristic diagram of the both filters when a point depressed is located close to (X1, Y1)
Figure 11B:
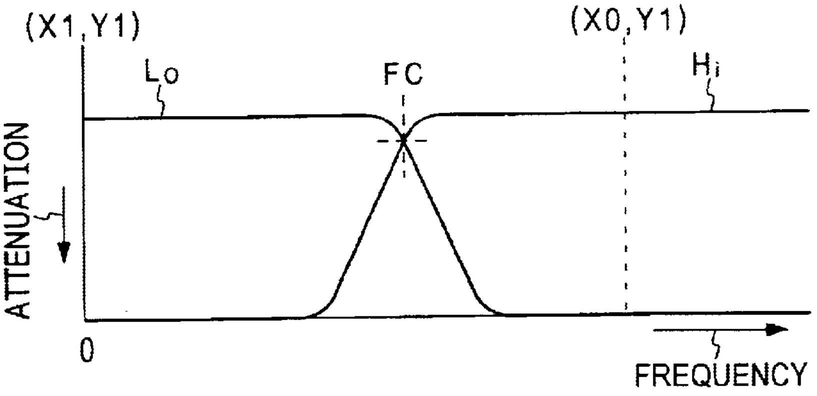
Figure 11C:
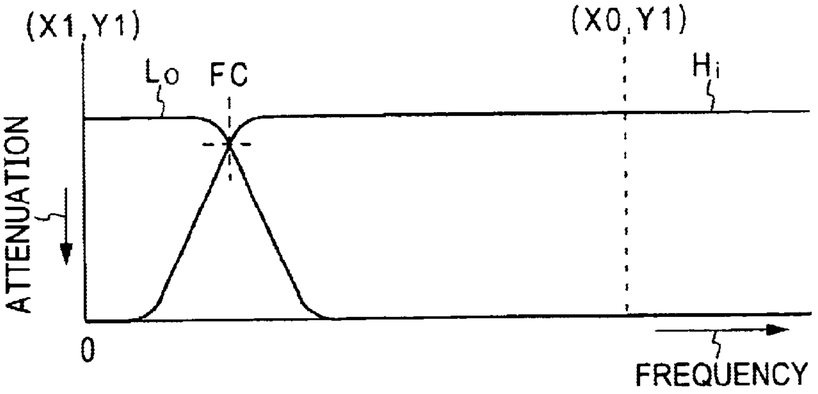

More specifically, when the point P depressed on the in-plane position sensor 37 is moved along the locus M2 shown in FIG. 9, the cut-off frequencies of the variable low pass filter and the variable high pass filter change from the responses shown in FIG. 11A through the responses shown in FIG. 11B to the responses shown in FIG. 11C.

Accordingly, when the point P depressed is located at (X0, Y1), the signal CH1 will be delivered from the processor 21 as a signal which contains a low pitch, a middle pitch and a high pitch component. However, when the point P depressed reaches a median point on the locus M2, a high pitch component is removed from the signal CH1 which is delivered from the processor 21, only leaving the low pitch and the middle pitch component. When the point P depressed reaches the position (X1, Y1), only the low pitch components in the signal CH1 will be delivered from the processor 21, but the cross fade function of the addition processor 23 causes the signal CH1 which is delivered to the output terminal 17 to be mute.

On the other hand, when the point depressed is located at (X0, Y1) only the high pitch component of the signal CH2 will be delivered from the processor 22 due to the high pass response, but the cross fade function of the addition processor 23 causes the signal CH2 which is delivered to the output terminal 17 to be mute. When the point P depressed approaches the median point on the locus M2, the signal CH2 will be delivered from the processor 22 as containing middle pitch components in addition to the high pitch components. When the position P depressed reaches the position (X1, Y1), the signal CH2 will be delivered as containing the low pitch, the middle pitch and the high pitch component from the processor 22, while the signal CH1 is muted at this point.

A control over the attenuation of the variable low pass filter and the variable high pass filter will be described. When the maneuver follow a locus M3 from point (X0, Y1) to (X0, Y0) as shown in FIG. 9, the respective attenuations of the variable low pass filter and the variable high pass filter will diminish gradually as indicated by curves G1, G2, G3 shown in FIGS. 10A and 10B. As the point P depressed approaches (X0, Y0), the filter response will be flattened, and ultimately a flat filter response at (X0, Y0) which means that there is no filter function.

Thus it will be seen that when the operational mode shown in FIG. 7 is set up, the cross fade control combined with the control of changing the cut-off frequencies FC of the variable low pass filter and the variable high pass filter in the same direction and the control of changing the attenuation of these filters can be achieved by the maneuver of a single fingertip on the in-plane position sensor 37. Accordingly, when the maneuver follows a locus M4 shown in FIG. 9, starting from a point (X0, Y0) and following a substantially trapezoidal locus to reach a point (X1, Y0), both the cut-off frequencies of the low pass and the high pass filter as well as the attenuations of these filters can be concurrently changed together with the cross fade. A variety of controls as mentioned above can be performed by the maneuver of a single fingertip on the operating surface of the in-plane position sensor 37 to depict loci M1,M2, M3, M4 and the like. When the fingertip ceases to move, the prevailing conditions are maintained.

Figure 12:
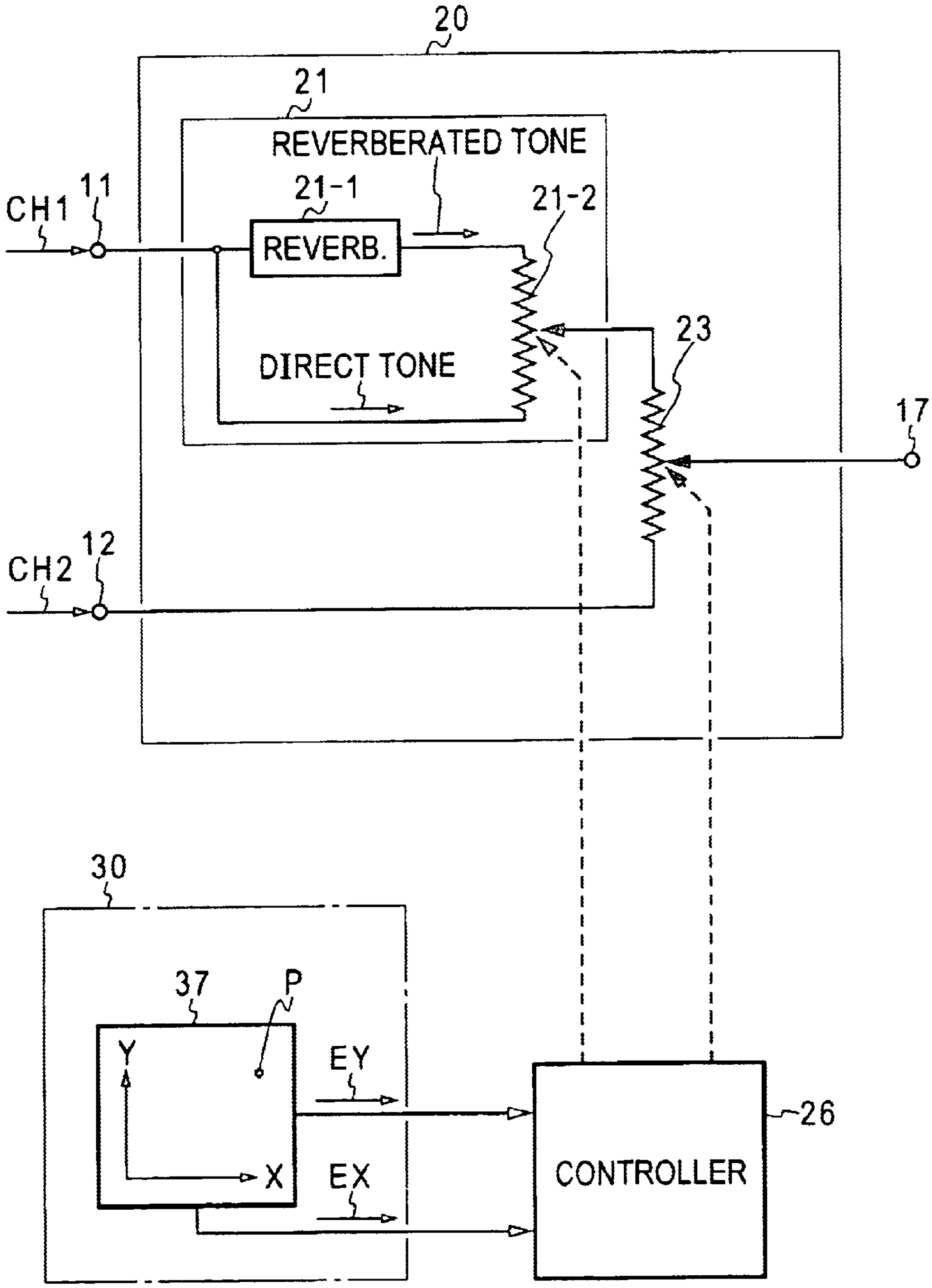
FIG. 12 is a block diagram showing a functional arrangement of another operational mode of the embodiment shown in FIG. 6.

FIG. 12 shows a functional arrangement of another operational mode set up in the audio mixer of the present invention. In this example, a reverberation adding function such as applying reverberations or delays is set up in either one or all of effect algorithm processors 21, 22 provided in the plurality of signal paths of the digital arithmetic unit 20, with the volume of the reverberations being controlled by one of the position signals delivered from the in-position sensor 37 and the other position signal controlling the addition processor 23, thus allowing the cross fade with reverberations to be executed.

In the embodiment shown in FIG. 12, there is provided a triple set of the mode changeover switches 31 shown in FIG. 6. The effect algorithm processor 21 connected in one of the signal paths includes the reverberation effect adding function 21-1, and the addition processor 21-2 which provides a cross fade between the reverberated signal obtained from the function 21-1 and no-reverberated or direct signal.

Figure 13:
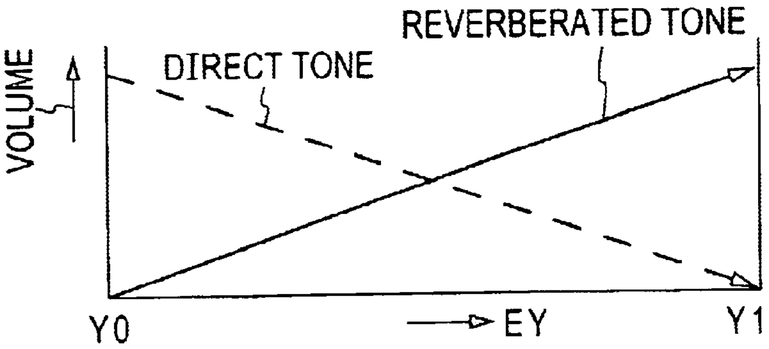
FIG. 13 is a diagram showing addition characteristic of an addition processor 21-2 plotted against the position signal EY in the functional arrangement shown in FIG. 12.
Figure 14:
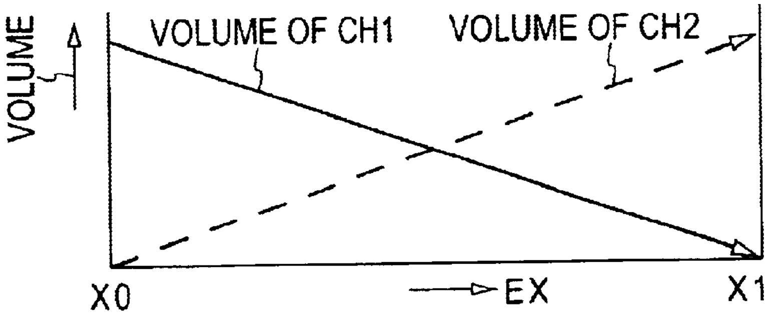
FIG. 14 is a diagram showing addition characteristic of an addition processor 23 plotted against the position signal EX in the functional arrangement shown in FIG. 12.

The addition processor 21-2 is controlled by one of the position signals from the in-plane position sensor 37, for example, by the signal EY while the addition processor 23 is controlled by the other position signal EX. FIG. 13 shows the addition response by the addition processor 21-2 plotted against the position signal EY and FIG. 14 shows the addition response by the addition processor 23 plotted against the position signal EX. In the example shown in FIG. 13, when a point having Y value of Y0 is depressed on the in-plane position sensor 37, the direct tones are delivered in their entirety (100%), and no reverberated tones will be delivered. When the point depressed is moved from Y0 toward Y1, the position signal EY increases, thus gradually decreasing the level of the direct tones and alternatively increasing the level of reverberated tones.

When the point maneuvered on the in-plane position sensor 37 is moved between X0 and X1 in the similar manner as described above in connection with FIG. 7, the addition processor 23 is controlled to provide a cross fade between the signals Ch1 and CH2.

Figure 15:
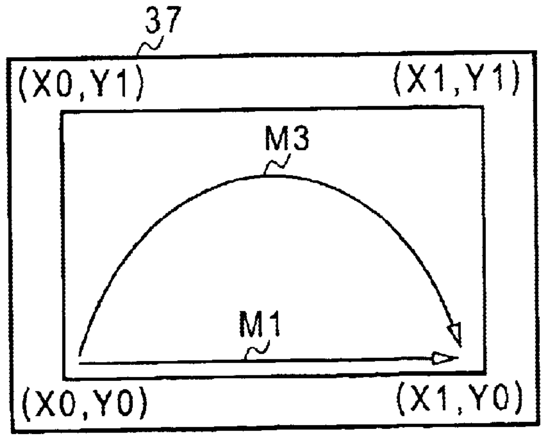
FIG. 15 is a diagram of an exemplary locus of maneuver on the in-plane position censor 37 in the functional arrangement shown in FIG. 12.

Accordingly, when the maneuver on the in-plane position sensor 37 follows a locus M1 shown in FIG. 15, for example, from point (X0, Y0) toward point (X1, Y0), the position signal EY remains to be 0 while position signal EX allows the cross fade between the signal CH1 and CH2 to take place. Alternatively, when the maneuver follows a locus L3 which depicts an arc from point (X0, Y0) to (X1, Y0), it is possible to implement a cross fade between the reverberated tones and direct tones of the signal CH1 in addition to the simple cross fade between the signal CH1 and signal CH2.

Specifically, when following the locus M3 starting from the position (X0, Y0), direct tones from the signal CH1 will be initially delivered at the initial position (X0, Y0), but as the locus M3 approaches toward Y1, the reverberated tones begin to appear while reducing the entire level of the signal CH1. The level of the signal CH2 rises instead. Consequently, the signal CH1 has its volume level gradually decreased while being changed into reverberated tones, and is ultimately replaced by the signal CH2. This situation will be audibly perceived as if the sound source of the signal CH1 is gradually moving away while the sound source of the signal CH2 is approaching.

When the locus L3 is followed in the opposite direction, the cross fade from the signal CH2 to the signal CH1 occurs while tones of the signal CH1 begin to be heard as reverberated tones of low level, which gradually change into direct tones with an increasing volume, and ultimately only the direct tones of the signal CH1 remain. Thus, in this instance, the situation will be audibly perceived as if the sound source of the signal CH1 is coming from far while the tones of the signal CH2 are gradually disappearing. Such control is enabled by the present invention with a single fingertip.

When it is desired to set up the reverberation adding function in the both signal paths, a situation that one of the sound sources is approaching from far while the other is moving away can be achieved for each of the signals CH1 and CH2.

Figure 5:
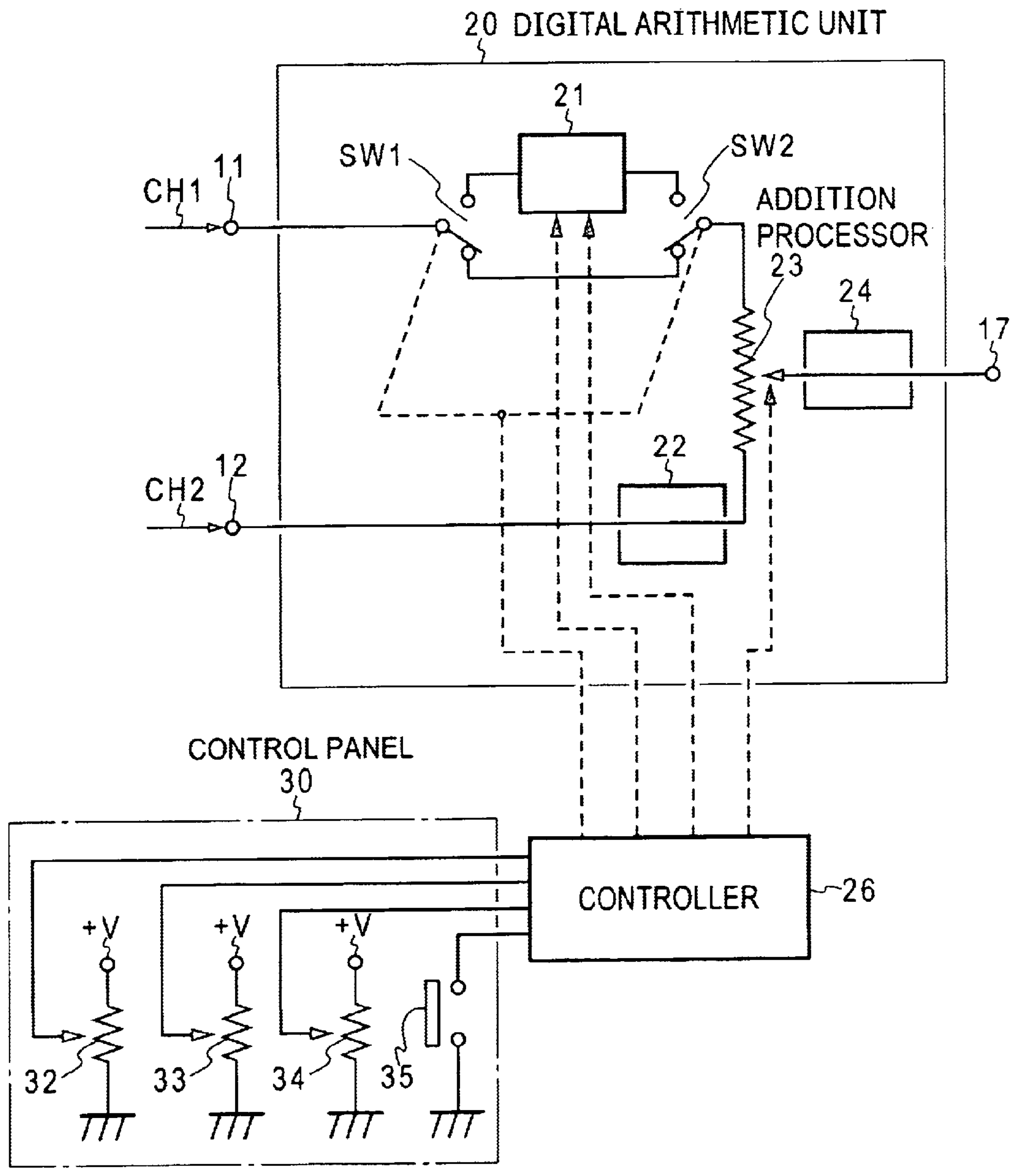
FIG. 5 PRIOR ART
FIG. 5 is a block diagram showing a functional arrangement of yet another operational mode of the prior art.
Figure 16:
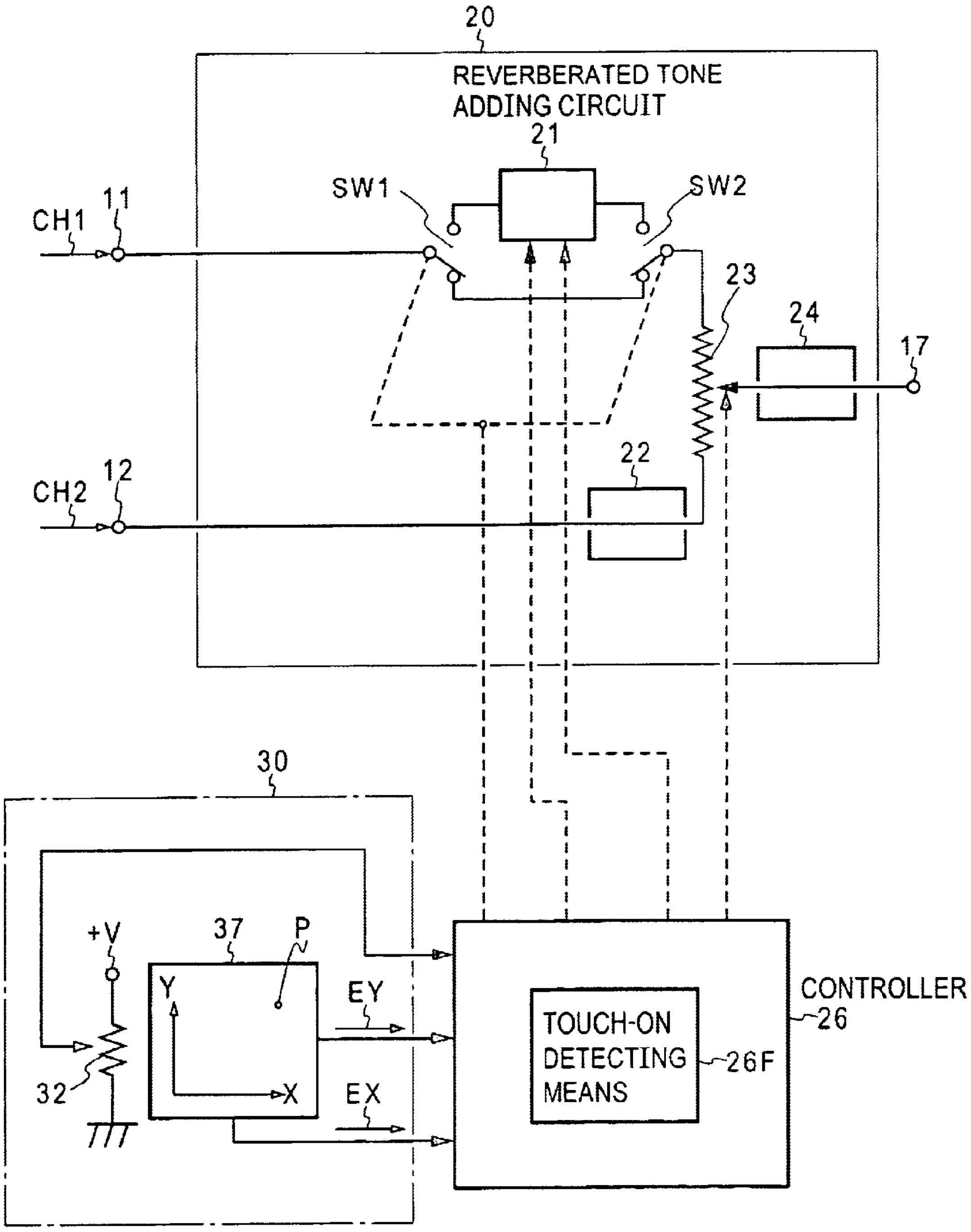
FIG. 16 is a block diagram showing a functional arrangement of a further operational mode of the embodiment shown in FIG. 6.

FIG. 16 shows an exemplary arrangement of a further operational mode of the audio mixer of the invention, which is established when the mode changeover switch is thrown to the position No. 4. This example shows the application of the invention to a conventional audio mixer which is provided with an effector as shown in FIG. 5. In this example, the effect algorithm processor 22 connected in the path of a signal CH2 is configured into a pass-through condition. In addition, a touch on detecting means 26F is provided in the controller 26 for indicating the depression of the operating surface 37*a* of the in-plane position sensor 37 for indicating the generation of the signal EX and/or EY.

When a depression applied to the in-plane position sensor 37 is detected, the controller 26 changes the effect changeover switches SW1 and SW2, whereby the effect algorithm processor 21 is connected into the path of the signal CH1. The effect algorithm processor 21 may comprise a reverberation adding effector, an echo adding effector or a chorus adding effector or the like, for example. It is assumed herein that it is configured as a reverberation adding effector.

When no depression is applied to the in-plane position sensor 37, the effect algorithm processor 21 is connected out of the path of the signal CH1 and therefore there is no effect applied to the signal CH1.

If a depression is now applied to the in-plane position sensor 37, the touch on detecting means 26 in the controller 26 detects the touch on condition, thereby changing the effect changeover switches SW1 and SW2 to connect the effect algorithm processor 21 into the path of the signal CH1.

Figure 17A:
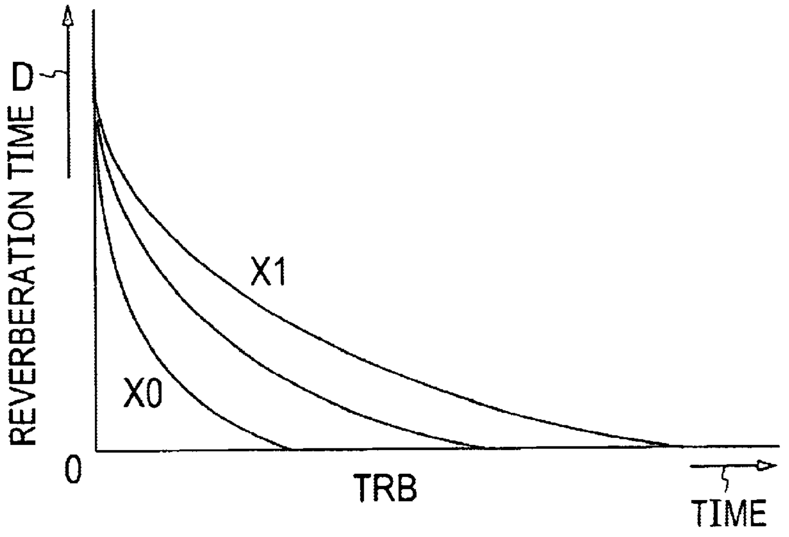
FIG. 17A graphically shows a reverberation time plotted against the position signal EX.
Figure 17B:
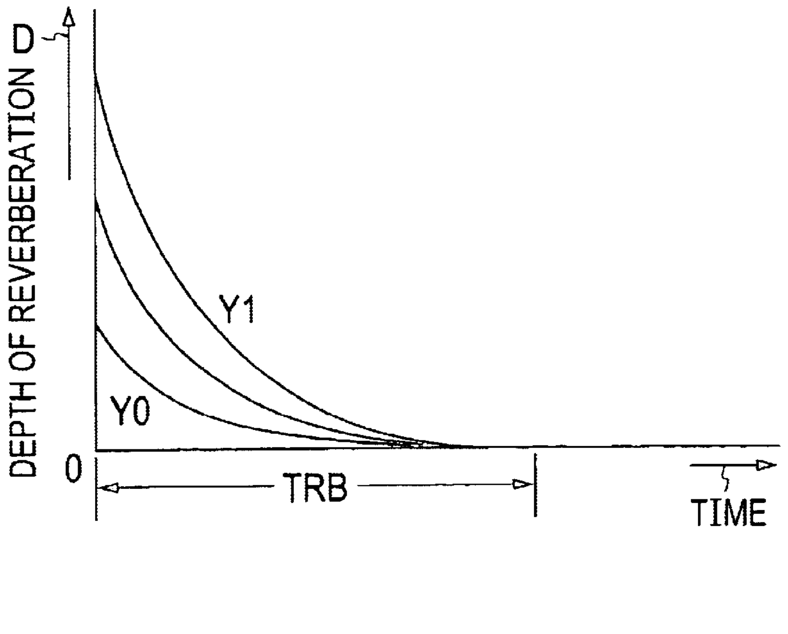
FIG. 17B graphically shows the depth of reverberation plotted against the position signal EY.

As mentioned above, the effect algorithm processor 21 is configured to be a reverberation adding effector. In this instance, the reverberation attenuation interval TRB can be controlled in accordance with the X-axis position signal EX while the depth D of the reverberation can be controlled in accordance with the Y-axis position signal EY Specifically, the closer the X value on the in-plane position sensor 37 moves from X0 toward X1, the longer the reverberation attenuation interval TRB is controlled as shown in FIG. 17A, for example. Similarly, the closer the Y value approaches from Y0 toward Y1, the greater the reverberation depth D can be controlled.

This means that whether or not the reverberation is applied and how the reverberation is applied can be controlled or adjusted by one-touch operation. A variety of effecters such as an echo adding effector or a distortion adding effector may be configured into the effect algorithm processor 21, whereby two parameters of each effector as well as whether or not the effect is added can be simultaneously controlled. It is to be noted that the addition ratio effected by the addition processor 23 can be controlled by applying a voltage from the sliding variable resistor 32 to the controller 26.

Figure 18:
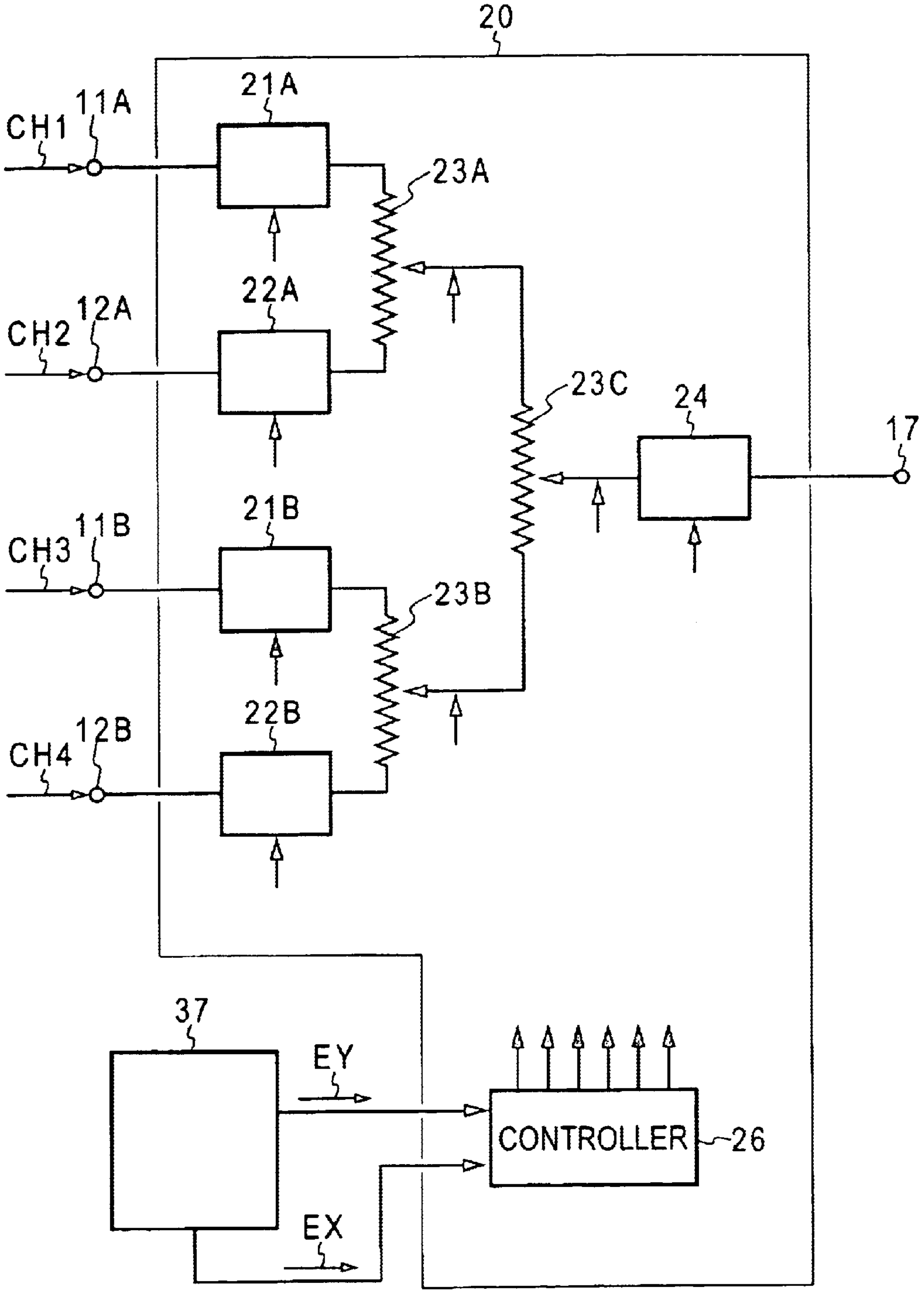
FIG. 18 is a block diagram showing a functional arrangement of a modification of the invention.

FIG. 18 shows a functional arrangement of part of an audio mixer according to another embodiment of the invention. In this example, there are a plurality of channels for the input signals, which are four in the present example. Each of the input signals CH1 to CH4 are individually processed in effect algorithm processors 21A, 22A, 21B, 22B and two of processed signals are added together by addition processors 23A, 23B and the outputs of these addition processors are again added together by an addition processor 23C into a single signal to be delivered.

The processors 21A, 22A, 21B, 22B and the addition processors 23A, 23B, 23C can be configured into desired functions as mentioned above by a maneuver on the in-plane position sensor 37.

Figure 19:
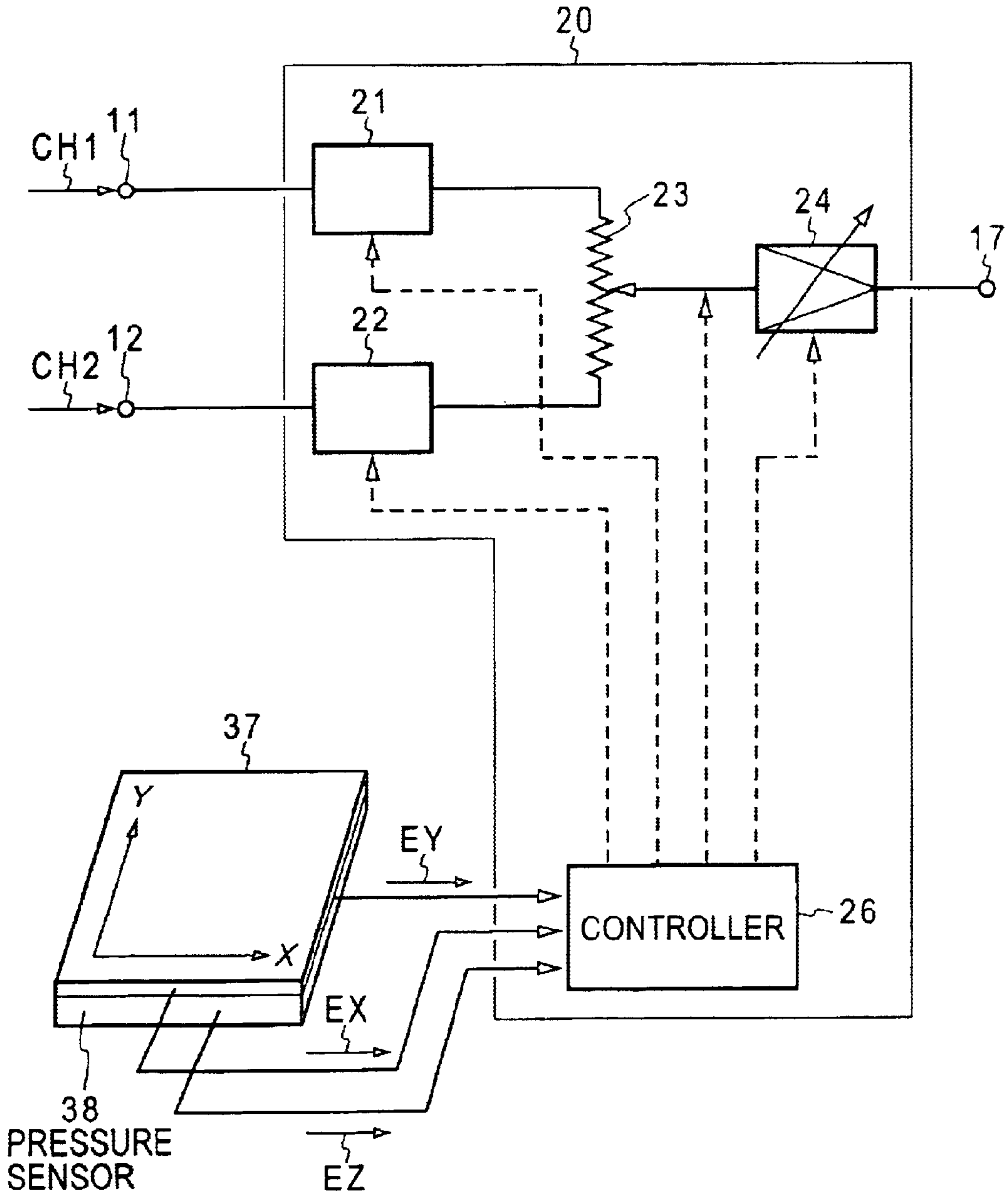
FIG. 19 is a block diagram showing another modification of the invention.

FIG. 19 shows a functional arrangement of an audio mixer according to a further embodiment of the invention. In this embodiment, a pressure sensor 38 is disposed in overlapping relationship with the in-plane position sensor 37. A detection signal from the pressure sensor 38 controls the gain of an effect algorithm processor 24 which is configured into a variable gain amplifier, and the pressure applied to the point P depressed controls the volume thereof.

The in-plane position sensor may capacitive or optical in nature which is capable of detecting a two dimensional (or in-plane position) in terms of positions along two crossing directions. However, an in-plane position sensor of a resistive nature provides a high resolution and is inexpensive in cost. The mode changeover switch 31 is not limited to a rotary switch, but may comprise a plurality of key switches provided separately for each mode.

As discussed above, in accordance with the invention, the maneuver takes place in accordance with the in-plane position sensor to improve the maneuverability, thus providing an audio mixer which can be operated in a simple manner by anyone.

What is claimed is:

1. An audio mixer comprising an effect algorithm processor inserted into each signal path of a plurality of channels of audio signals;

an addition processor for performing an addition processing function of audio signals delivered from respective channels to deliver a single output signal;

an in-plane position sensor for delivering the position of a maneuvered point on a operating surface in the form of a first and a second position signal which represent positions in orthogonally crossing two directions on the operating surface;

a mode changeover switch for selecting one of different operating modes of the audio mixer, the respective effect algorithm processors having functions which are configured in accordance with the one operation mode selected by the mode changeover switch; and a controller responsive to the selected one operation mode selected by the mode changeover switch for concurrently controlling by means of the first and the second position signals delivered from the in-plane position sensor which are obtained by a single fingertip operation at least two of the functions of the effect algorithm processors and the addition processor.

2. The audio mixer according to claim 1, wherein there are provided two signal channels, one of the two effect algorithm processors has a variable low pass filter function while the other has a variable high pass filter function, the first and the second position signals are control parameters controlling the respective cut-off frequencies and the respective attenuations of the variable low pass and the variable high pass filters, and the second position signal represents a control parameter controlling an addition ratio effected by the addition processor.

3. The audio mixer according to claim 1, wherein there are provided two signal channels, either one or both of the effect algorithm processors have a reverberation adding function, and the first position signal represents a control parameter for controlling the volume of reverberated tones produced by the reverberation adding function while the second position signal represents a control parameter controlling the addition ratio effected by the addition processor.

4. The audio mixer according to claim 1, wherein at least one of the effect algorithm processors which is inserted in one of the channels has an effector function in which the first and the second position signal are control parameters for controlling a plurality of conditions of the effector function, the controller includes means for detecting whether or not the in-phase position sensor generates the position signal and controls said one effect algorithm processor in a manner such that the effector function is provided to its corresponding channel when the position signals are detected or not provided to render the channel into a pass-through condition when the position signals are not detected.

5. The audio mixer according to claim 1, wherein at least one of the effect algorithm processors has an effector function which is a reverberation adding effector function, and the first and second position signals represent control parameters for controlling the reverberation attenuation interval and the reverberation depth, respectively.

6. The audio mixer according to claim 1, wherein at least one of the effect algorithm processors has an effector function which is an echo adding effector function.

7. The audio mixer according to claim 1, in which the controller includes position storage means which stores the first and the second position signal delivered by the in-plane position sensors and which delivers the stored first and second position signals as control parameters.

8. The audio mixer according to claim 1, in which the addition processor and the effect algorithm processors are implemented in a digital arithmetic unit, and the controller is implemented by a microcomputer.

9. The audio mixer according to claim 1, in which the position sensor has an operating surface which, when depressed, delivers a first and a second position signal, further comprising a pressure sensor disposed in overlapping relationship with the position sensor for detecting a force of depression applied to the operating surface of the position sensor, the controller applying a detection signal from the pressure sensor to one of the effect algorithm pressures as a control parameter which controls the response thereof.

* * * * *